United States Patent
Moeller et al.

(10) Patent No.: US 9,595,172 B2
(45) Date of Patent: Mar. 14, 2017

(54) DATAGLOVE HAVING TACTILE FEEDBACK AND METHOD

(75) Inventors: Christoph Moeller, Saalfeld (DE); Marco Opitz, Rohrbach (DE); Alexander Kostka, Regensburg (DE); Nils Kornau, Rheine (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 6 days.

(21) Appl. No.: 14/348,329

(22) PCT Filed: Sep. 4, 2012

(86) PCT No.: PCT/DE2012/000881
§ 371 (c)(1),
(2), (4) Date: Jul. 9, 2014

(87) PCT Pub. No.: WO2013/044893
PCT Pub. Date: Apr. 4, 2013

(65) Prior Publication Data
US 2014/0313022 A1 Oct. 23, 2014

(30) Foreign Application Priority Data
Sep. 29, 2011 (DE) .......... 10 2011 114 535

(51) Int. Cl.
*G08B 6/00* (2006.01)
*G06F 3/0354* (2013.01)
(Continued)

(52) U.S. Cl.
CPC ............ *G08B 6/00* (2013.01); *G06F 1/1626* (2013.01); *G06F 3/011* (2013.01); *G06F 3/014* (2013.01);
(Continued)

(58) Field of Classification Search
CPC ............ G08B 6/00; G06F 3/011–3/016; G06F 3/03545–3/03547; G06F 1/1626
See application file for complete search history.

(56) References Cited

U.S. PATENT DOCUMENTS 5,354,162 A * 10/1994 Burdea et al. .............. 414/5
5,429,140 A * 7/1995 Burdea et al. ............ 600/587
(Continued)

FOREIGN PATENT DOCUMENTS

| DE | 42 40 531 C1 | 2/1994 |
| DE | 44 00 790 A1 | 5/1995 |

(Continued)

OTHER PUBLICATIONS

Corresponding International Search Report with English Translation dated Dec. 19, 2012 (four (4) pages).
(Continued)

*Primary Examiner* — Hai Phan
*Assistant Examiner* — Orlando Bousono
(74) *Attorney, Agent, or Firm* — Crowell & Moring LLP

(57) ABSTRACT

A data glove for generating tactile feedback at a finger upon interaction of the finger with an interaction element on an infrared touchscreen includes receiving elements for receiving the fingers of an operator and stimulators for generating tactile feedback attached on the finger-receiving elements. The date glove also includes elements for identifying the finger interacting with the infrared touchscreen and a signal generator for exciting the stimulator of the interacting finger upon successful actuation of an interaction element on the infrared touchscreen.

12 Claims, 2 Drawing Sheets

(51) Int. Cl.
*G06F 3/01* (2006.01)
*G06F 1/16* (2006.01)

(52) U.S. Cl.
CPC .......... *G06F 3/016* (2013.01); *G06F 3/03545* (2013.01); *G06F 3/03547* (2013.01)

(56) References Cited

U.S. PATENT DOCUMENTS

| | | | | |
|---|---|---|---|---|
| 5,583,478 | A * | 12/1996 | Renzi | 340/407.1 |
| 5,737,505 | A * | 4/1998 | Shaw et al. | 345/419 |
| 5,977,867 | A * | 11/1999 | Blouin | 340/407.2 |
| 6,275,213 | B1 * | 8/2001 | Tremblay et al. | 345/156 |
| 6,424,333 | B1 * | 7/2002 | Tremblay et al. | 345/156 |
| 6,803,905 | B1 * | 10/2004 | Capps et al. | 345/173 |
| 2002/0033795 | A1 * | 3/2002 | Shahoian et al. | 345/156 |
| 2003/0174121 | A1 * | 9/2003 | Poupyrev et al. | 345/156 |
| 2003/0179190 | A1 * | 9/2003 | Franzen | 345/173 |
| 2003/0184574 | A1 * | 10/2003 | Phillips et al. | 345/702 |
| 2004/0046746 | A1 * | 3/2004 | Monson | 345/173 |
| 2004/0077272 | A1 * | 4/2004 | Jurmain et al. | 446/268 |
| 2005/0017947 | A1 * | 1/2005 | Shahoian et al. | 345/156 |
| 2005/0052430 | A1 * | 3/2005 | Shahoian et al. | 345/173 |
| 2006/0007124 | A1 | 1/2006 | Dehlin | |
| 2006/0109256 | A1 * | 5/2006 | Grant et al. | 345/173 |
| 2006/0119586 | A1 * | 6/2006 | Grant et al. | 345/173 |
| 2007/0146316 | A1 * | 6/2007 | Poupyrev et al. | 345/156 |
| 2007/0236450 | A1 * | 10/2007 | Colgate et al. | 345/156 |
| 2008/0024459 | A1 * | 1/2008 | Poupyrev et al. | 345/173 |
| 2008/0060856 | A1 * | 3/2008 | Shahoian et al. | 178/18.03 |
| 2008/0062143 | A1 * | 3/2008 | Shahoian et al. | 345/173 |
| 2008/0062144 | A1 * | 3/2008 | Shahoian et al. | 345/173 |
| 2008/0062145 | A1 * | 3/2008 | Shahoian et al. | 345/173 |
| 2008/0238886 | A1 * | 10/2008 | Bengtsson et al. | 345/177 |
| 2009/0085878 | A1 * | 4/2009 | Heubel et al. | 345/173 |
| 2010/0052879 | A1 * | 3/2010 | Nanos | 340/407.2 |
| 2010/0055651 | A1 * | 3/2010 | Rantala et al. | 434/114 |
| 2010/0182245 | A1 * | 7/2010 | Edwards et al. | 345/173 |
| 2011/0095994 | A1 * | 4/2011 | Birnbaum | 345/173 |
| 2012/0075202 | A1 * | 3/2012 | Michaelis | 345/173 |

FOREIGN PATENT DOCUMENTS

| | | |
|---|---|---|
| DE | 20 2005 019 953 U1 | 2/2006 |
| DE | 10 2005 011 4 | 9/2006 |
| GB | 2 305 714 A | 4/1997 |
| WO | WO 2010/032223 A1 | 3/2010 |

OTHER PUBLICATIONS

English Machine translation of previously submitted German-language European Office Action issued in European counterpart application No. 12 772 201.5-1972 dated Mar. 24, 2016 (Nine (9) pages).

Australian Office Action issued in Australian counterpart application No. 2012315001 dated Dec. 20, 2016 (Four (4) pages).

International Preliminary Report on Patentability (PCT/IB/373), including Written Opinion (PCT/ISA/237) dated Apr. 1, 2014 (Seven (7) pages).

* cited by examiner

DATAGLOVE HAVING TACTILE FEEDBACK AND METHOD

BACKGROUND AND SUMMARY OF THE INVENTION

Exemplary embodiments of the invention relate to a data glove having tactile feedback at a finger upon interaction of the finger with an interaction element on an infrared touch screen. Exemplary embodiments of the invention further relate to a method for generating tactile feedback at a finger of a data glove upon interaction of the finger with an interaction element on a touch screen.

In the following description a touch screen is generally to be understood as a touch-sensitive surface.

Touch screens are well known and have found their way into many areas of daily life, e.g., operating cash machines. In principle, a distinction is made between two different technologies of touch screens: the resistive touch screens and the capacitive touch screens. There are also technologies that are based thereon such as near-field imaging, acoustic wave or infrared touch screen.

A touch screen, tactile screen, touch-sensitive screen or touch panel is a combined input and output device at which by touching parts of an image, the program sequence of a technical device, in most cases of a computer, can be controlled directly. The technical implementation of the command input is, as it were, invisible for the user and thus creates the impression of directly controlling a computer via fingertip.

Touchscreens are characterized by simple and flexible operation. They make it possible to directly interact with graphic objects that are presented on the display. This is implemented through touch-sensitive active surfaces that are arranged around graphic objects. The graphic objects serve for visual identification of the interaction element. The operating logic underlying the active surfaces normally follows the behavior of physically real operating devices such as, for example, switches or control elements. In this manner, characteristics of almost any input device can be simulated.

However, operating via touchscreens is often not as efficient as with physically real operating devices, for example, a keyboard. A reason for this is the missing feedback of the touchscreen. This has a double effect since tactile feedback during input actions via physically real input devices, on the one hand, helps identifying the correct input device and, on the other, provides feedback about the success of the performed operating action. While in the case of a physically real keyboard, identification can take place not only through the usual identification via the eye, but in addition also by feeling edges, surfaces and gaps via the tactile sense of the finger tips, the latter is not possible in the case of a virtual keyboard. When inputting through a virtual keyboard, the visual sensory channel is therefore more challenged, as a result of which only reduced visual capacities are available for further actions. Furthermore, this can result in restricted performance of the operator if he/she expects feedback but does not receive it.

Also, when performing the actual operating action, the virtual keyboard offers no tactile feedback. The operator receives feedback via the receptors of the finger tips whether the screen has been touched. However, this feedback is not necessarily associated with the success of the operating action. For this, feedback has to be generated visually again. In contrast, in the case of a physically real keyboard, the operator, during the input action, has first to overcome the pressure point of the spring and subsequently has to carry out a translational actuating movement. The operator receives feedback on the success of his operating action through the key stop point which limits the translational actuating movement.

This means a physically real keyboard provides tactile feedback to the operator both before and after an input action, as a result of which the visual sensory channel of the operator is relieved. Thus, the input action can be performed more efficiently than with a virtual keyboard.

It is known that in the case of a touchscreen, the finger position on the touchscreen can be detected. Thus, if an input action is performed on the screen by the operator, first the infrared touch frame detects on the screen the relative position of the finger that touches the touchscreen or is situated in close proximity above the touchscreen. If this position coincides with that of an interaction element, the intended operating functionality is performed.

German patent document DE 10 2005 011 432 A1 discloses a virtual reality system in which individual fingers of a data glove can be identified by means of a camera system. German patent document DE 20 2005 019 953 U1 discloses a data glove having feedback.

Exemplary embodiments of the invention are directed to a data glove by means of which the operator receives tactile feedback upon successful completion of an operating action on an infrared touchscreen.

Further, exemplary embodiments of the invention are directed to a method by means of which upon successful completion of an operating action on a touchscreen, tactile feedback is generated at a finger of a data glove that interacts with a touch screen.

According to the invention, the stimulators for generating tactile feedback are attached to the finger-receiving elements of the data glove. The data glove according to the invention has means for identifying the finger interacting with the infrared touchscreen and a signal generator for exciting the stimulator of the interacting finger upon successful actuation of an interaction element on the infrared touchscreen.

According to method described in the invention, the finger of a data glove, which finger interacts with a touch screen, is identified. Upon successful actuation of an interaction element on the touchscreen, a tactile stimulus is generated at the interacting finger.

Here, the tactile feedback at the finger that is identified as the one that interacts with the touchscreen (selective feedback) is advantageously generated by a stimulator for generating a vibration stimulus, a mechanical, electrical or thermal stimulus. Due to the rapid response characteristic of the stimulator and the good perceptibility and the physical comfort of the operator, the vibrating stimulus is preferred over other types of stimuli (pressure stimuli, thermal stimuli, electrical stimuli).

Identifying the interacting finger can take place, e.g., by means of a plurality of cameras, according to the disclosure of German patent document DE 10 2005 011 432 A1.

In an advantageous configuration of the invention, the touchscreen is an infrared touchscreen. In this case, infrared technology is used for detecting the finger interacting on the infrared touchscreen. Advantageously, infrared photodetectors, e.g., infrared phototransistors or infrared photodiodes, which are able to detect the infrared rays emitted from an infrared touchscreen, are attached in the region of the fingertips of the data glove.

The photocurrents of the infrared photodetectors used for detection are evaluated, and the infrared photodetector having the maximum photocurrent is determined. The evaluation is advantageously carried out by means of a microcontroller, e.g., by means of an integrated comparator. Since the infrared grid of the infrared touchscreen becomes weaker with increasing distance from the display, the infrared photodetector having the maximum photocurrent is closer to the screen surface of the touchscreen compared with the other infrared photodetectors. Since each finger-receiving element of the data glove, advantageously in the region of the fingertips, is associated with an infrared photodetector, the finger interacting with the touchscreen thus can be determined.

Upon successful actuation of an interaction element on the infrared touchscreen, the infrared touchscreen sends an electrical signal to the data glove. The connection between the infrared touchscreen and the data glove is established by means of known interfaces, e.g., serial interfaces.

In a particular embodiment of the invention, transmitting the electrical signal to the data glove triggers the identification of the finger interacting with the infrared touchscreen. In other words, only after the infrared touchscreen registers a successful actuation of an interaction element and therefore transmits a corresponding trigger signal to the data glove, the identification of that finger is initiated in the data glove that interacts with the touch screen and thereby has triggered the successful actuation of the interaction element.

The trigger signal can be a specific electrical signal in which further information is contained. For example, it can contain whether the successful actuation of the interaction element is a particular operating functionality such as a "lift off" event (=the interacting finger leaves the active screen surface) or a "touch" event (=the interacting finger touches an active screen surface of the touchscreen for identifying operating elements on the touchscreen). Another example would be a "drag" event (=the interacting finger moves from the outside into an active screen surface of the touchscreen).

After a successful actuation of the interaction element on the infrared touchscreen has been registered and transmitted to the data glove and after the corresponding interacting finger has been identified, a signal is sent to the stimulator of the corresponding finger so as to generate a tactile stimulus. It is possible here that the signal sent to the stimulator is a specific signal that depends on the trigger signal sent by the data glove according to the operating functionality. Thus, it is possible, depending on the operating functionality, to transmit a corresponding feedback to the interacting finger, which feedback varies, e.g., in terms of vibration duration, vibration frequency (strength) and amplitude curve.

The display quality of the infrared touchscreen is not negatively influenced in any way by the sensor system used; the transmission degree is not reduced. By decoupling the device generating the feedback (stimulator on the data glove) from the touchscreen, no vibration-induced blurry effect occurs on the touchscreen.

BRIEF DESCRIPTION OF THE DRAWING FIGURES

The invention is explained in greater detail below with reference to the figures. In the figures.

DETAILED DESCRIPTION

Figure 1:
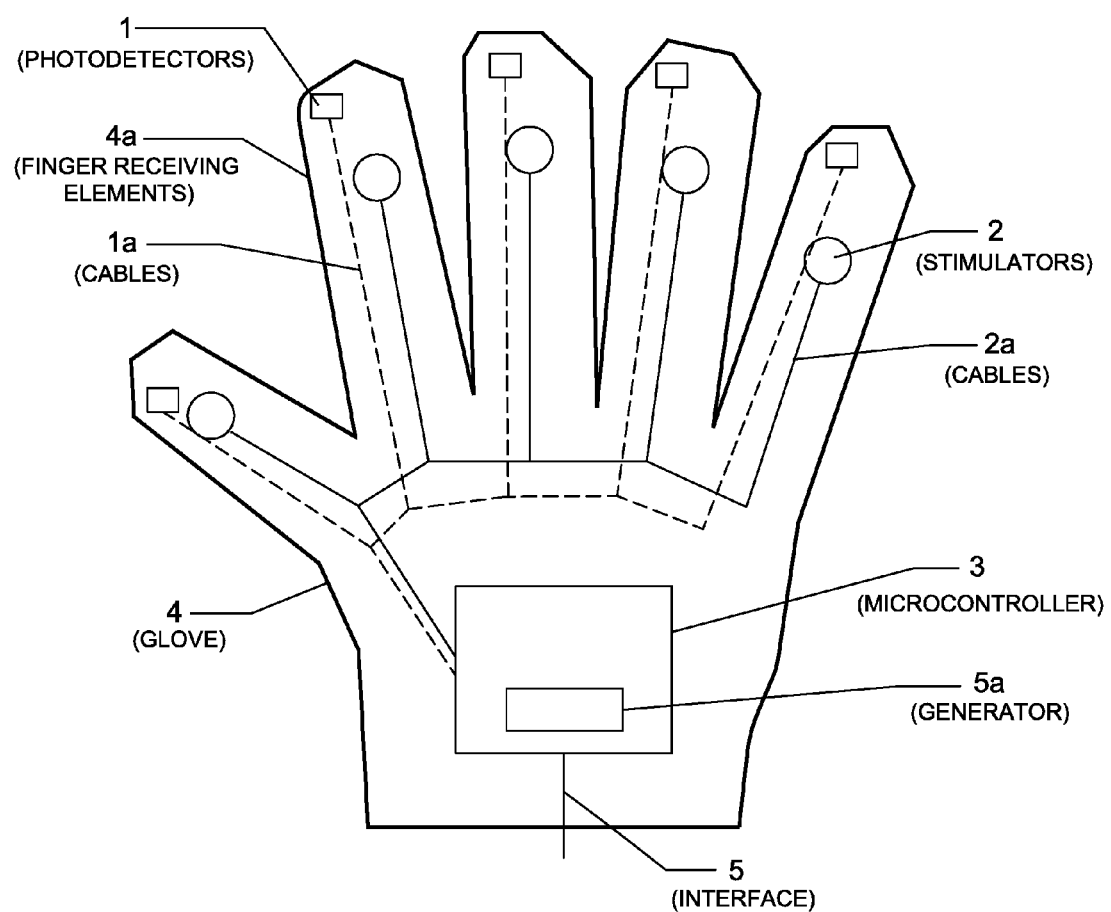
FIG. 1 shows a schematic diagram of a data glove according to the invention.
Figure 2:
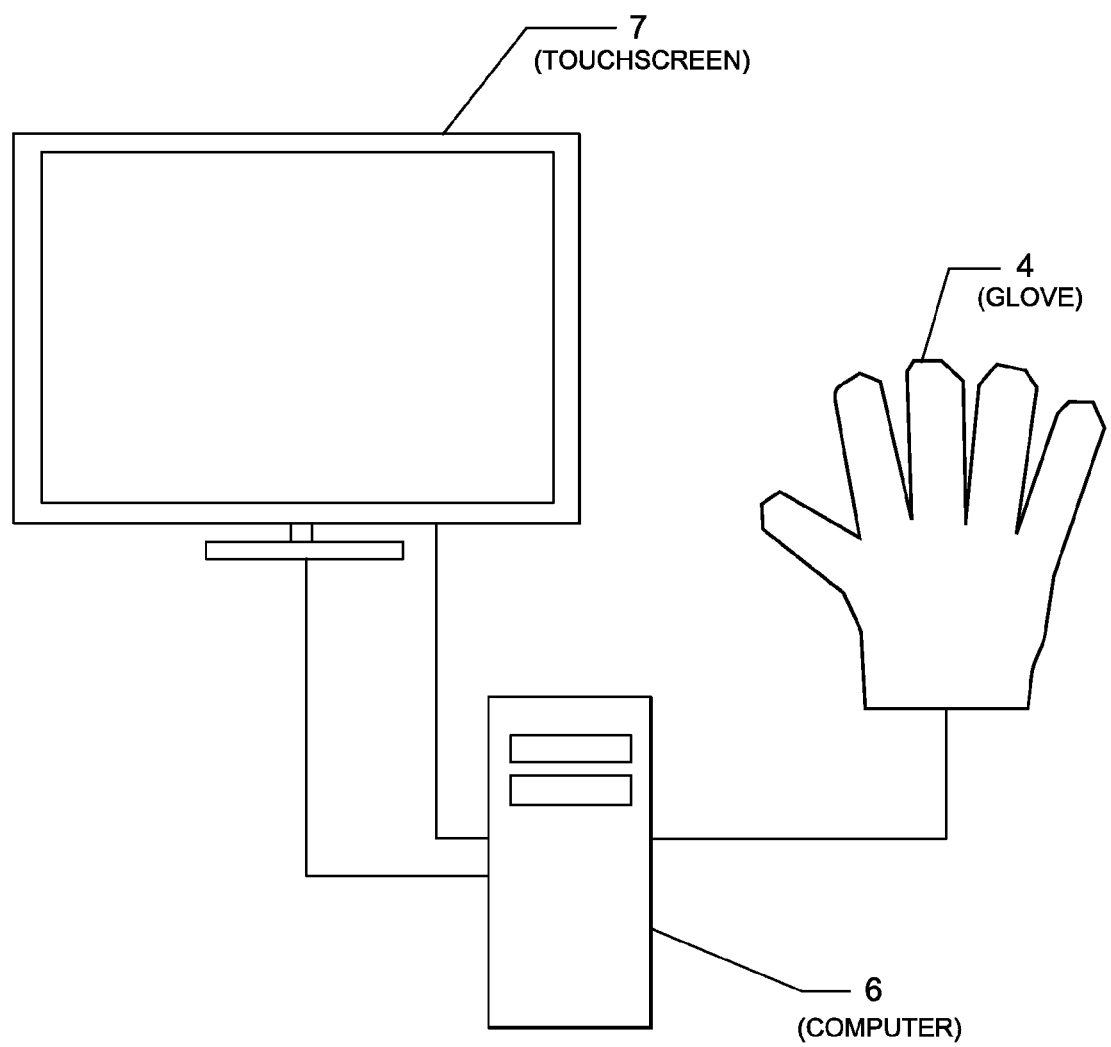
FIG. 2 shows a schematic diagram of a data glove in interaction with an infrared touchscreen.

FIG. 1 shows a schematic diagram of a data glove according to the invention. The stimulators 2, e.g., stimulus-generating electric motors and the signal-processing logic unit 3, e.g., a microcontroller which can be, e.g., an operational amplifier, are arranged on the finger-receiving elements 4a of the data glove 4. In order not to restrict the operating actions of the operator (not illustrated) with the touchscreen 7 and other physically existing operating elements, all components can advantageously be arranged on the glove at the back of the hand. The sensitive lower side of the fingers which is also used by the operator to sense other interaction elements is thereby kept completely free.

Advantageously, the stimulators 2 are attached in the region of the middle phalanges to the finger-receiving elements 4a of the data glove 4 and are connected to the microcontroller 3 by cables 2a. The stimulators 2 can be commercially available DC electric motors like the ones that are also used in cell phones. A direct current source attached to the data glove 4 for the direct current electric motors is not illustrated.

The stimulators 2 are activated via a signal generator 5a. As an example, the signal generator 5a is integrated in the microcontroller 3. However, it is also possible that the signal generator 5a is arranged outside of the microcontroller 3.

The infrared photodetectors 1, e.g., infrared transistors, are attached in the area of the fingertips of the finger-receiving elements 4a in such a manner that, during a typical operating action, they are oriented in the direction of the photodiodes (transmitter) of the infrared touch frame 7. They are characterized by robustness and low procurement costs. Likewise, they are connected to the microcontroller 3 via simple cables 1a.

The microcontroller 3 is connected to the infrared touchscreen 7 via a conventional serial interface 5 for receiving trigger signals via a computer 6. The connection can also be, e.g., a radio connection or infrared connection.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A data glove for generating tactile feedback at a user's finger upon touching the finger to an interaction element on an infrared touchscreen, wherein the data glove comprises:
   receiving elements configured to receive fingers of an operator;
   stimulators configured to generate tactile feedback and attached to the finger-receiving elements;
   a plurality of infrared photodetectors configured to identify a finger touching the infrared touchscreen; and
   a signal generator configured to excite a stimulator of the finger touching the infrared touchscreen upon successful actuation of the interaction element on the infrared touchscreen,
   wherein the plurality of infrared photodetectors is arranged at the data glove and each of the plurality of infrared photodetectors is assigned to one of the receiving elements,
   wherein each of the plurality of infrared photodetectors is configured to detect infrared rays emitted by the infrared touchscreen based on a distance of the respective one of the plurality of infrared photodetectors from the infrared touchscreen, and wherein the finger for which a corresponding one of the plurality of infrared photodetectors provides a maximum photocurrent is identified as the finger touching the infrared touchscreen.

2. The data glove according to claim 1, wherein the plurality of infrared photodetectors are further configured to identify infrared radiation emitted by the infrared touchscreen and attached in a fingertip region of the receiving elements.

3. The data glove according to claim 2, wherein the plurality of infrared photodetectors further include a signal-processing logic unit connected to the plurality of infrared photodetectors and configured to compare photocurrents generated in the plurality of infrared photodetectors.

4. The data glove according to claim 3, wherein the signal-processing logic unit is connected to the infrared touchscreen via an interface.

5. The data glove according to claim 3, wherein the signal generator is connected to the signal-processing logic unit or is integrated in the signal-processing logic unit.

6. The data glove according to claim 1, wherein the stimulator is configured to generate a vibration, mechanical, electrical, or thermal stimulus.

7. A method for generating tactile feedback at a user's finger of a data glove upon touching the finger to an interaction element on an infrared touchscreen, the method comprising:
    identifying, by a plurality of infrared photodetectors, a finger touching the interaction element on the infrared touchscreen;
    determining that a successful actuation of the interaction element on the infrared touchscreen has occurred; and
    generating, by a stimulator, a tactile stimulus at the finger touching the infrared touchscreen when it is determined that there is a successful actuation of the interaction element on the infrared touchscreen;
    wherein the plurality of infrared photodetectors is arranged at the data glove and each of the plurality of infrared photodetectors is assigned to one of the receiving elements,
    wherein each of the plurality of infrared photodetectors is configured to detect infrared rays emitted by the infrared touchscreen based on a distance of the respective one of the plurality of infrared photodetectors from the infrared touchscreen, and
    wherein the finger for which a corresponding one of the plurality of infrared photodetectors provides a maximum photocurrent is identified as the finger touching the infrared touchscreen.

8. The method according to claim 7, wherein in order to determine the finger interacting with the infrared touchscreen, the plurality of infrared photodetectors are attached in a fingertip region of the data glove, wherein each of the plurality of infrared photodetectors are evaluated, and a one of the plurality of infrared photodetectors having a maximum photocurrent is determined.

9. The method according to claim 7, wherein when it is determined that there is a successful actuation of the interacting element on the touchscreen, an electrical signal is sent from the touchscreen to the data glove to generate the tactile stimulus at the interacting finger.

10. The method according to claim 9, wherein the transmission of the electrical signal to the data glove triggers the identification of the interacting finger.

11. The method according to claim 9, wherein depending on an operating functionality of the successfully actuated interaction element, a specific electrical signal is sent to the data glove.

12. The method according to claim 11, wherein corresponding to the specific electrical signal sent to the data glove, a further specific signal is sent to a stimulator for generating the tactile stimulus.

* * * * *